United States Patent [19]
Clarke et al.

[11] 3,892,675
[45] July 1, 1975

[54] COATING COMPOSITIONS

[75] Inventors: Warwick Kingston Clarke; Ronald Wynford Kenyon; David Robinson, all of Manchester, England

[73] Assignee: Imperial Chemical Industries Limited, London, England

[22] Filed: Jan. 4, 1974

[21] Appl. No.: 430,623

[30]  Foreign Application Priority Data
Jan. 23, 1973   United Kingdom................. 3349/73

[52] U.S. Cl..... 252/301.3 W; 117/33.5 T; 117/152; 117/155 R; 162/135; 162/162; 252/301.2 W
[51] Int. Cl. .......................... C09k 1/00; B44d 5/00
[58] Field of Search ............ 252/301.2 W, 301.3 W; 117/33.5 T, 143 R, 143 A, 152, 154, 155; 162;162

[56]  References Cited
UNITED STATES PATENTS

| | | | |
|---|---|---|---|
| 2,710,285 | 6/1955 | Trusler.................... | 252/301.2 W |
| 2,949,382 | 8/1960 | Dickerman et al................ | 117/65 |
| 3,360,479 | 12/1967 | Hausermann............... | 252/301.2 W |
| 3,449,257 | 6/1969 | Tuite et al................. | 252/301.2 W |
| 3,464,886 | 9/1969 | Paul................... | 162/162 |
| 3,475,190 | 10/1969 | Fischer et al...................... | 106/210 |
| 3,657,139 | 4/1972 | Brocklehurst et al....... | 252/301.2 W |
| 3,663,538 | 5/1972 | Lebkuecher et al........... | 260/240 B |

OTHER PUBLICATIONS

J. Casey, "Pulp and Paper," Vol. 3, 2nd Ed., Interscience, N.Y., 1961, Chapter XIX.
K. W. Britt, Editor, "Pulp and Paper Technology," 2nd Ed., Van Nostrand Reinhold, 1970, Chapter 7-1.

Primary Examiner—John H. Mack
Assistant Examiner—Aaron Weisstuch
Attorney, Agent, or Firm—Cushman, Darby & Cushman

[57]  ABSTRACT

The use of sparingly water-soluble optical brightening agents in coating compositions containing white pigment extender such as clay and polyvinyl acetate latex as sole binding agent enables coatings to be obtained on, e.g., paper of improved whiteness and fastness to light. Preferred optical brightening agents are heterocyclic, especially triazinyl derivatives of pyrene or naphthalene.

8 Claims, No Drawings

COATING COMPOSITIONS

This invention relates to coating compositions, and more especially to coating compositions of improved whiteness and based on white pigment and a latex binder.

It is known to use coatings, for example to provide paper with a smooth surface, which comprise an extender such as china clay and a binder such as starch or casein and in addition, optionally, a synthetic latex. Such coatings may also include a conventional stilbene type optical brightening agent to increase their whiteness. Starch and casein are however not entirely satisfactory for use in coating compositions of high solid content or in high speed coating processes, and in these cases it may be desirable to use a synthetic latex alone as the sole binding agent or in combination with thickeners, viscosity modifiers or water retention aids. However conventional stilbene type optical brightening agents used in known manner are not satisfactory in compositions containing synthetic latex as sole binder. The present invention enables coatings of improved whiteness and light fastness properties, based on latex as the sole binding agent, to be prepared.

According to the invention there are provided coating compositions comprising white pigment extender, polyvinyl acetate latex as sole binding agent, one or more sparingly water-soluble optical brightening agents in finely-divided form and water.

As white pigment extender there is mentioned for example china clay, whiting, barytes, satin-white and titanium dioxide.

The white pigment extender will preferably comprise from 30 to 70 % by weight of the coating composition.

As polyvinyl acetate latices there are mentioned aqueous dispersions, emulsions or suspensions of polymers obtained by polymerisation of vinyl acetate and copolymers of vinyl acetate with one or more unsaturated monomeric compounds such as acrylic acid, methacrylic acid, esters of acrylic acid, for example, methyl acrylate, ethyl acrylate, butyl acrylate, hydroxyethyl acrylate, hydroxy propyl acrylate, esters of methacrylic acid, for example, methyl methacrylate, ethyl methacrylate, butyl methacrylate, hydroxyethyl methacrylate, hydroxy propyl methacrylate, ethoxyethylmethacrylate, vinyl chloride, vinylidene chloride, vinyl propionate, ethylene, styrene, acrylamide, methacrylamide, acrylonitrile or methacrylonitrile.

Latices derived from other polymers, for example styrene/acrylic acid copolymers, may be used in conjunction with a polyvinyl acetate latex but will reduce the light fastness of the coating.

The latex is preferably used in amount sufficient to give polymer solid in amount from 1 to 30 %, and especially from 5 to 20 %, of the weight of white pigment extender such as clay.

The latex may be of the alkali-sensitive type and adjustment of the pH of the coating composition to 8–9.5 may be desirable to obtain suitable rheological properties. In other cases a "water-retention aid" or thickener such as a water-soluble alginate or cellulose ether such as sodium carboxymethyl cellulose may be added for this purpose.

If desired mixtures of these optical brightening agents may be used.

The optical brightening agent may be used for example as a finely-divided readily dispersible solid or as a suspension in water or aqueous medium.

By sparingly water-soluble optical brightening agent there is meant any optical brightening agent having a solubility in water of less than 0.5 % at 20°C. Types of optical brightening agent which can be used include heterocyclic derivatives of pyrene, pyrene carboxylic esters, heterocyclic derivatives of naphthalene, pyrazolines, mono- or bis-oxazoles, thiazoles, and imidazoles, coumarins and related compounds, naphthalimides and triazolyl derivatives of stilbene. Suitable such compounds are described in U.K. Pat. Nos. 985,484, 1,028,922, 1,028,923, 1,209,631, 1,221,930, 1,222,970 and 1,294,088. Specific such compounds include 1-(2,4-dimethoxy-s-triazin-6-yl)pyrene, 1-(2,4-diisopropoxy-s-triazin-6-yl)pyrene, 1-(2,4-diallyloxy-s-triazin-6-yl)pyrene, 1-(2,4-diphenoxy-s-triazin-6-yl)pyrene, benzoxazol-2-ylpyrene, 1-(2,4-dichloro-s-triazin-6-yl)-4-ethoxynaphthalene, 1-(2,4-dichloro-s-triazin-6-yl)-4-phenoxynaphthalene, 5-(2,4-dichloro-s-triazin-6-yl)acenaphthalene, 6-(2,4-dichloropyrimidin-6-yl)-7,8-benzochroman, 3-(4-chlorophenyl)-1-(4-amino-sulphonylphenyl)-2-pyrazoline, 3-(4-chlorophenyl)-1-(4-methoxycarbonylphenyl)-2-pyrazoline, 3-(4-chlorophenyl)-1-(4-$\beta$-methoxyethoxycarbonylphenyl)-2-pyrazoline, 3-(4-chlorophenyl)-1-(4-$\beta$-methoxyethoxycarbonylmethoxycarbonylphenyl)-2-pyrazoline, 3-(4-chlorophenyl)-1-(4-cyanomethoxycarbonylphenyl)-2-pyrazoline, 3-(4-chlorophenyl)-1-(4-methylsulphonylphenyl)-2-pyrazoline, 2-(4-aminosulphonylphenyl)-3,3a,4,5-tetrahydrobenz(g)indazole, 2,5-bis(5-butylbenzoxazol-2-yl)-thiophene, 1,2-bis-(benzimidazol-2-yl)ethylene, 7-diethylamino-4-methylcoumarin, 3-phenyl-7-(3-methylpyrazol-1-yl)coumarin, 3-phenyl-7-(2-chloro-4-diethylamino-s-triazin-6-ylamino)-coumarin, N-methyl-4-methoxy-naphthalimide, 4-chloro-2'-cyano-4'-(naphth-[1,2-d]triazol-2-yl)stilbene, 1,4-bis(p-cyanostyryl)benzene and 1,4-bis[2-(pyrid-2-yl)vinyl]benzene.

The optical brightening agent is preferably used in amount from 0.001 to 1 %, and especially from 0.01 to 0.25 % of the weight of white pigment extender.

In order to adjust the viscosity of the coating composition it may be desirable to add a thickener, for example a cellulose ether such as carboxylalkyl cellulose or hydroxylalkylcellulose or alginic acid or an alginate. The amount of thickener is preferably from 0.2 to 10 %, and especially from 0.5 to 3.0 %, of the weight of extender such as clay.

The whiteness obtained by use of the coating composition may in some cases be improved by addition of an assistant which may be for example a polyethylene oxide or alkyl ether thereof, copolymers of ethylene and propylene oxides, polyvinylalcohol, polyvinyl pyrrolidone, and water-soluble condensation products of formaldehyde with urea or melamine. The amount of assistant is preferably from 0.002 to 5 % and especially from 0.02 to 0.5 %, of the weight of extender such as clay.

The coating composition of the invention may be prepared by mixing the components of the composition in any order, for example, by dispersing the clay or other white pigment extender in water, preferably in presence of a dispersing agent, adding the latex and then the optical brightening agent, and if desired the assistant, together with additional water and thickener, if necessary, to adjust the concentration or viscosity of the composition.

The coating composition may be used to coat paper, board, films, textile fabrics, non-woven materials and suitable building materials. The composition may be applied to the substrate by any conventional means, for example air-knife, blade, brush, roller or bar coating techniques and the coating dried at temperatures in the range 80° to 200°C, and preferably 110° to 150°C.

The coatings so obtained possess superior light fastness to those obtained with other types of latex in similar coatings. Using these latexes the sparingly water-soluble optical brightening agents not only afford superior whiteness than conventional water-soluble optical brightening agents but the whiteness does not decrease as coating weight, i.e., the amount of solids applied as coating, increases.

The invention is illustrated but not limited by the following Examples in which all parts and percentages are by weight unless otherwise stated.

EXAMPLE 1

100 Parts of china clay are dispersed in 60 parts of water in presence of 0.75 parts of a dispersing agent commercially available under the trade name Dispersant A using a high-speed mixer. 16 Parts (dry weight) of a polyvinyl acetate emulsion containing approximately 50 % of solids, commercially available under the trade name Vinamul 9300, are then added. Aqueous ammonia is added to adjust the pH to 8.5 – 9.5 and 0.12 parts of 1-(2,4-dimethoxy-s-triazin-6-yl)pyrene is added from an aqueous dispersion prepared by gravel milling 1 % of the pyrene compound in water containing 0.2 % of a sodium salt of an alkylated naphthalene sulphonic acid for 16 hours. The final mix is adjusted to 50 % total solids by the addition of water.

The composition is coated onto a Cream Wove paper using a No. 3 'K' coating rod and the coating dried on a rotating heated cylinder at 100° – 125°C.

The fluorescence of the coating is measured using the Z filter (range 400 – 500 nm) on a Harrison FM colorimeter (1969 model) and the light fastness of the coating is determined by exposure to daylight and assessment against BS 1006 : 1961 wool standards (1–8).

For comparison similar coatings are prepared replacing the Vinamul 9300 with 14 parts (dry weight) of a styrene/butadiene latex as a 50 % emulsion and 2 parts of sodium carboxymethyl cellulose or replacing the 1-(2,4-dimethoxy-s-triazin-6-yl-pyrene by (a) 0.12 parts or (b) 0.48 parts of a conventional stilbene-type optical brightening agent 4,4'-bis[2-diethanolamino-4-(sulphoanilino)-s-triazin-6-ylamino)-stilbene-2,2'-disulphonic acid. Fluorescence values and light fastnesses are as follows:

| Latex | light fastness | Fluorescence value |
|---|---|---|
| Vinamul 9300 | 4 | 8.0 |
| Styrene/butadiene | less than 1 | 4.8 |
| Stilbene-type optical brightening agent (a) | — | 2.6 |
| Stilbene-type optical brightening agent (b) | — | 3.9 |

EXAMPLE 2

The procedure of Example 1 using Vinamul 9300 is repeated with the addition of 0.24 parts of polyethylene glycol of molecular weight 4000. The light fastness of the coating was 4 and the fluorescence value 8.5.

EXAMPLES 3–5

The procedure of Example 2 is repeated using as latex
a. 7 parts (dry weight) of Vinamul 9300 and 7 parts (dry weight) of an alkali-swellable polyvinyl acetate/acrylic emulsion commercially available under the trade name Primal AR-74
b. 10.5 parts (dry weight) of a 50 % styrene/butadiene emulsion and 3.5 parts of Primal AR-74 and
(c) 10.5 parts of a styrene/acrylic latex commercially available as Vinacryl 7170 and 3.5 parts of Primal AR-74. Fluorescence values and light fastnesses are as follows:

| Latex | light fastness | Fluorescence |
|---|---|---|
| (a) | 3–4 | 7.0 |
| (b) | less than 1 | 5.1 |
| (c) | 2–3 | 7.1 |

EXAMPLE 6

The procedure of Example 1 is repeated using as latex 14 parts of a vinyl acetate/ethylene copolymer emulsion commercially available under the trade name Vinamul 3240. A coating of light fastness 3–4 and fluorescence value 9.5 is obtained. If the coating composition above contains in addition 2 parts of sodium carboxymethylcellulose a coating of light fastness 3 and fluorescence value 9.3 is obtained.

EXAMPLES 7–13

The procedure of Example 1 is repeated the Vinamul 9300 by 10.5 parts of Vinamul 3240 and 3.5 parts of Primal AR-74 and replacing the optical brightening agent by the agents listed below.

| Optical brightening agents | light fastness | fluorescence values |
|---|---|---|
| 1-(2,4-dimethoxy-s-triazin-6-yl)pyrene | 3 | 8.0 |
| 4-(2,4-dichloro-s-triazin-6-yl)-1-ethoxynaphthalene | 2–3 | 7.7 |
| 3-(4-chlorophenyl)-1-4-amino-sulphonylphenyl)-2-pyrazolone | 1–2 | 8.1 |
| 2,5-bis(benzoxazol-2-yl)thiophene | 3 | 7.3 |
| 3-phenyl-7-(3-methylpyrazol-1-yl)-coumarin | 2–3 | 7.5 |
| 5-phenyl-2-pyrenyl-1,3,4-oxadiazole | 2–3 | 7.6 |
| 1-(2,4-dialloxy-s-triazin-6-yl)pyrene | 2 | 9.4 |

We claim:

1. Coating compositions comprising white pigment extender, polyvinyl acetate latex as sole binding agent, at least one sparingly water-soluble optical brightening agent in finely-divided form, and water.

2. Coating compositions as claimed in claim 1 which contain a water-retention aid or thickener.

3. Coating compositions as claimed in claim 1 wherein the optical brightening agent has a solubility in water of less than 0.5 % at 20°C.

4. Coating compositions as claimed in claim 1 wherein the optical brightening agent is a heterocyclic derivative of pyrene or naphthalene.

5. Coating compositions as claimed in claim 1 wherein the optical brightening agent is 1-(2,4-dimethoxy-s-triazin-6-yl)pyrene.

6. Coating compositions as claimed in claim 1 which contain a whiteness assistant chosen from the group consisting of a polyethylene oxide or alkyl ether thereof, a copolymer of ethylene and propylene oxides, polyvinyl alcohol, polyvinylpyrrolidone or water-soluble condensation products of formaldehyde with urea or melamine.

7. A process for preparing the coating compositions claimed in claim 1 which comprises mixing the components of the coating composition in any order.

8. A process as claimed in claim 7 in which the white pigment extender is dispersed in water, and the latex and optical brightening agent are then added in that order.

* * * * *